United States Patent
Lin et al.

(10) Patent No.: US 10,722,849 B2
(45) Date of Patent: Jul. 28, 2020

(54) PRESSURE SENSITIVE GRAPHENE-BASED VALVE ELEMENT

(71) Applicants: NITTO DENKO CORPORATION, Osaka (JP); Weiping Lin, Carlsbad, CA (US)

(72) Inventors: Weiping Lin, Carlsbad, CA (US);
Isamu Kitahara, San Diego, CA (US);
Shijun Zheng, San Diego, CA (US);
Peng Wang, San Diego, CA (US);
John Ericson, La Palma, CA (US);
Rebecca Romero, Escondido, CA (US)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 16/076,814

(22) PCT Filed: Feb. 10, 2017

(86) PCT No.: PCT/US2017/017524
§ 371 (c)(1),
(2) Date: Aug. 9, 2018

(87) PCT Pub. No.: WO2017/139678
PCT Pub. Date: Aug. 17, 2017

(65) Prior Publication Data
US 2019/0015792 A1   Jan. 17, 2019

Related U.S. Application Data

(60) Provisional application No. 62/294,914, filed on Feb. 12, 2016.

(51) Int. Cl.
*B01D 71/02* (2006.01)
*B01D 69/10* (2006.01)
(Continued)

(52) U.S. Cl.
CPC .......... *B01D 71/021* (2013.01); *B01D 69/10* (2013.01); *B01D 71/024* (2013.01); *F16K 15/00* (2013.01);
(Continued)

(58) Field of Classification Search
CPC .... B01D 71/021; B01D 69/10; B01D 71/024; B01D 2323/30; F16K 15/00; F16K 25/005; Y10T 137/7879
(Continued)

(56) References Cited

U.S. PATENT DOCUMENTS

| 4,900,626 A | 2/1990 | Fabre |
| 5,186,431 A | 2/1993 | Tamari |

(Continued)

FOREIGN PATENT DOCUMENTS

| CN | 101116905 A | 2/2008 |
| CN | 104151775 A | 11/2014 |

(Continued)

OTHER PUBLICATIONS

Mahesh Vaka et al., Highly Sensitive Pressure Sensor Based on Graphene Hybrids, Arabian Journal of Chemistry, available online Mar. 2, 2018 (Year: 2018).*

(Continued)

*Primary Examiner* — Jessica Cahill
(74) *Attorney, Agent, or Firm* — Maschoff Brennan; Brent A. Johnson; David W. Old (57) ABSTRACT

Described herein is a graphene-based valve element capable of passive and repeatable stopping or allowing fluid flow as a function of inlet pressure. Passive flow controller devices based on the valve element are also described.

19 Claims, 8 Drawing Sheets

(51) Int. Cl.
*F16K 17/40* (2006.01)
*F16K 15/00* (2006.01)
*F16K 25/00* (2006.01)

(52) U.S. Cl.
CPC ............ *F16K 17/40* (2013.01); *F16K 25/005* (2013.01); *B01D 2323/30* (2013.01)

(58) Field of Classification Search
USPC ............................ 251/369; 95/19, 23, 45–56
See application file for complete search history.

(56) References Cited

U.S. PATENT DOCUMENTS

| | | | |
|---|---|---|---|
| 5,332,000 | A | 7/1994 | Gassner |
| 6,805,730 | B2 | 10/2004 | Herczeg |
| 7,597,855 | B2 | 10/2009 | Trentacosta et al. |
| 7,648,118 | B2 | 1/2010 | Ukpai et al. |
| 8,790,318 | B2 | 7/2014 | Chappel |
| 9,132,389 | B2 | 9/2015 | Wickramasinghe et al. |
| 9,572,918 | B2 * | 2/2017 | Bachmann ............. B01D 61/02 |
| 10,029,215 | B2 * | 7/2018 | Park ................... B01D 53/228 |
| 2012/0048804 | A1 * | 3/2012 | Stetson ................. B01D 61/02 210/653 |
| 2013/0192460 | A1 * | 8/2013 | Miller ................... B01D 53/22 95/47 |
| 2013/0192461 | A1 * | 8/2013 | Miller ................ B01D 67/0039 95/47 |
| 2014/0053725 | A1 * | 2/2014 | Allen ..................... B01D 63/00 95/46 |
| 2014/0377738 | A1 | 12/2014 | Bachmann et al. |
| 2015/0165389 | A1 | 6/2015 | McGinniss et al. |
| 2015/0354710 | A1 * | 12/2015 | Richardson ............. F16K 1/526 210/419 |
| 2016/0074815 | A1 * | 3/2016 | Sinton ................... B01D 69/02 95/49 |
| 2016/0354729 | A1 * | 12/2016 | Krishna ............... B01D 69/148 |

FOREIGN PATENT DOCUMENTS

| | | |
|---|---|---|
| WO | 2008-130431 A2 | 10/2008 |
| WO | 2015-145155 A1 | 10/2015 |
| WO | 2015-195636 A1 | 12/2015 |

OTHER PUBLICATIONS

Lee W. Drahushuk et al., Mechanisms of Gas Permeation through Single Layer Graphene Membranes, 2012, Langmuir, 16671-16678. (Year: 2012).*

J. Zhao et al., Etching Gas-Sieving Nanopores in Single-Layer Graphene with an Angstrom Precision for High-Performance Gas Mixture Separation, 2017, Sci Adv 5 (Year: 2019).*

Doh, I. et al., Passive flow-rate regulators using pressure-dependent autonomous deflection of parallel membrane valves, Lab on a Chip, 9(14), 2070-5, 2009.

Gund, V. et al., Graphene one-shot micro-valve: Towards vaporizable electronics, 28th IEEE International Conference on Micro Electro Mechanical Systems (MEMS),1090-1093, Jan. 2015.

Zhong, W.-R. et al., Thermal control in graphene nanoribbons: thermal valve, thermal switch and thermal amplifier. Nanoscale, 4(16), 5217-20, 2012.

Chen, Juang-Tsai, et al., "Enhancing polymer/graphene oxide gas barrier film properties by introducing new crystals", Carbon, vol. 75 (2014) 443-451.

Hu, Meng, et al., "Enabling Graphene Oxide Nanosheets as Water Separation Membranes", Enviromental Science & Technology, (2013) vol. 47, 3715-3723.

International Search Report, PCT/US2017/017524, dated May 26, 2017.

Nair, R.R., et al., "Unimpeded permeation of water through helium-leak-tight graphene-based membranes", Science, vol. 335, No. 6067 (2012) 442-444.

Su, Y., et al., "Impermeable Barrier Films and Protective Coatings Based on Reduced Graphene Oxide", Nature Communications, vol. 5, No. 4843 (2014) 1-10.

* cited by examiner

PRESSURE SENSITIVE GRAPHENE-BASED VALVE ELEMENT

CROSS REFERENCE TO RELATED APPLICATIONS

This application is a national phase of PCT/US2017/017524, filed Oct. 2, 2017; which claims the benefit of U.S. Provisional Application No. 62/294,914, filed Feb. 12, 2016, and all of which are incorporated by reference in their entireties.

FIELD OF INVENTION

The present embodiments relate to graphene-based valve elements, wherein the valve elements having the ability to open or close a fluid flow based on upstream pressure. The embodiments are also related to an automatic passive flow controller device containing the valve elements that can be used in pressure regulation or flow control applications.

SUMMARY

The present embodiments include a valve element that can be used to predictably control a fluid flow as a function of upstream pressure. The fluid can be a gas, a liquid, or a mixture of a gas and water vapor.

In some embodiments, a valve element is disposed between a gas pressure differential, wherein the valve element comprises: (1) a separating wall placed between a fluid, such as a gas, at a higher pressure and a fluid, such as a gas, at a lower pressure, wherein the difference between the higher pressure and the lower pressure is a pressure differential, wherein the wall comprises an aperture allowing fluid communication between the fluids or gases; (2) a valve membrane occluding the aperture, wherein the membrane comprises a graphene-based layer and a porous support, wherein the graphene based layer is deposited upon the porous support; wherein the valve membrane allows the fluid or gas at the higher pressure to begin to pass through the aperture. The porous support can comprise a polymer or hollow fibers. The graphene-based layer can comprise: graphene; reduced graphene oxide; and/or graphene oxide. In some embodiments, the graphene-based layer can have a thickness ranging from 10 nm to 100 nm. In some embodiments, the graphene-based layer can further comprise a polymer material. The polymer material can comprise a water soluble polymer, such as polyvinyl alcohol.

In some embodiments, the graphene layer can further comprise a crosslinker which can create covalent linkages between materials within the layer. The crosslinker can comprise alkyldiamine, alkylenediamine, arylenediamine, polyvinyl alcohol, or any combinations thereof. In some embodiments, the arylenediamine is an optionally substituted meta-phenylenediamine.

In some embodiments, the valve membrane can allow for repeated opening and closing of a fluid flow in reaction to the changes in the fluid pressure differential. In some embodiments, the opening threshold ranges from about 10 psi to about 100 psi. In some embodiments, the closing threshold can be at or below about 30 psi.

In some embodiments, a passive flow controller device is described, wherein the device regulating upstream gas pressure or a fluid flows passively based on upstream pressure. The device can comprise the aforementioned valve elements.

DETAILED DESCRIPTION

I. General

As used herein the term "$C_{m-n}$" refers to a carbon chain having m to n carbon atoms. For example, $C_{1-12}$ alkyl includes saturated hydrocarbon containing 1, 2, 3, 4, 5, 6, 7, 8, 9, 10, 11, or 12 carbon atoms.

The term "alkyl" as used herein refers to hydrocarbon comprising carbon and hydrogen containing no double or triple bonds. Alkyl may be linear, branched, cyclic, or a combination thereof, and contain from one to thirty-five carbon atoms. Alkyl can be optionally substituted. The optionally substituted alkyl includes substituted alkyl and un-substituted alkyl. The substituted alkyl includes any substituents applicable. For example, $C_{1-6}$ alkyl groups include methyl, ethyl, propyl, isopropyl, cyclopropyl, n-butyl, iso-butyl, tert-butyl, cyclobutyl, pentyl isomers, cyclopentane, hexyl, cyclohexane, hexyl, cyclohexane.

The term "alkylene" as used herein refers to a divalent alkyl moiety, where the divalent are from different carbon atoms, e.g. —$CH_2CH_2$—, —$CH_2CH_2CH_2$—, etc.

The term "alkyldiamine" as used herein refers to a diamine containing 2 amino-groups that are attached to one carbon atom or two carbon atoms, e.g. $H_2N$—$CH_2$—$NH_2$, $H_2N$—$CH_2$—$CH_2$—$NH_2$, etc.

The term "alkylenediamine" as used herein refers to a diamine containing 2 amino-groups that are attached to two carbon atoms, e.g. $H_2N-CH_2CH_2-NH_2$, $H_2N-CH_2CH_2CH_2-NH_2$, etc.

The term "aryl" as used herein has the broadest meaning generally understood in the art, and may include an aromatic ring or aromatic ring system. Aryl can be optionally substituted. Optionally substituted aryl include substituted aryl and un-substituted aryl. The substituted aryl includes any substituents applicable. Examples of aryl groups include phenyl, naphthyl, acenaphthyl, etc. "$C_{6-30}$ aryl" refers to aryl where the ring or ring system has 6 to 30 carbon atoms. "$C_{6-30}$ aryl" does not limit any substituents attached to the ring atoms.

The term "arylene" as used herein refers to a divalent aryl moiety, e.g. $-C_6H_4-$, etc.

The term "arylenediamine" as used herein refers to a diamine containing 2 amino-groups that are attached to two aromatic ring carbon atoms, e.g. phenylenediamine ($H_2N$-Ph-$NH_2$), meta-phenylenediamine (MPD), etc.

II. Valve Element

Some embodiments include a pressure responsive valve element. The valve element can regulate the flow of a fluid. The fluid can be a gas, a liquid, or a mixture of gas and water vapor.

In some embodiments, the valve element can be disposed between two fluids having different pressures. For example, the valve element may comprise a separating wall placed between fluid at a higher pressure and fluid at a lower pressure. The separating wall may comprise an aperture allowing fluid communication between the two fluids. The valve may further comprise a valve membrane occluding the aperture. The valve membrane may comprise a graphene-based layer. Additionally, the valve membrane may comprise a porous support. For example, the graphene based layer can be deposited upon the porous support. The valve membrane can allow higher pressure fluid to pass through the aperture upon reaching a threshold pressure differential between the higher and the lower pressures; this pressure differential is referred to as the opening threshold.

In some embodiments, the valve membrane can hinder, prevent, preclude, or otherwise impede fluid flow through the aperture at or below a lower threshold between the higher and the lower pressures. This pressure differential is referred to as the closing threshold.

In some embodiments, the valve membrane can regulate the flow of a fluid through the aperture as a function of the pressure differential between higher pressure and the lower pressure (referred to herein as "pressure differential" for purposes of convenience). For example, once flow is established by exceeding the opening threshold, the flow can be controlled by increasing the pressure differential to increase flow, or by decreasing the pressure differential to decrease flow, provided that the pressure differential is above the closing threshold. In some embodiments, the opening threshold can be in a range of about 10-100 psi, about 10-50 psi, about 10-15 psi, about 10-20 psi, about 20-30 psi, about 20-25 psi, about 30-40 psi, about 40-50 psi, at least about 50 psi, or at least about 55 psi. In some embodiments, the closing threshold can be below about 10-30 psi. In some embodiments, the valve membrane can allow for repeated opening and closing of fluid flow in reaction to the changes in the fluid pressure differential.

In some embodiments, hindering the fluid flow through the aperture can range from substantially no fluid passing through the aperture to less than about 0.001 liter per minute (LPM), less than about 0.01 LPM, or less than about 0.1 LPM passing through the aperture. In some embodiments, when allowing fluid to pass through the aperture at the opening threshold, the valve membrane can allow a fluid flow through the aperture at a flow rate of at least about 0.25 LPM, at least about 0.5 LPM, at least about 0.75 LPM, at least about 1.0 LPM, at least about 1.25 LPM, at least about 1.5 LPM, or any fluid flow rate in a range bounded by these values. The valve membrane, when the opening threshold is reached, can allow a flow rate of at least about 1.0 LPM.

In some embodiments, the separating wall can comprise a metal, a non-metal, and/or a combination thereof. The metal can comprise metal or metal alloys. The metal can be treated, such as anodizing or electroplating (e.g., chroming, galvanizing). The metal can comprise steel, stainless steel, brass, cast iron, nickel, copper, titanium, zinc, magnesium, aluminum, niobium, zirconium, and any combinations thereof. The non-metal can comprise polymers such as polyvinyl butyral (PVB), polyvinyl chloride (PVC), chlorinated PVC (CPVC), polyvinyl acetate (PVAc), polyacrylonitrile, ethylene vinyl alcohol (EVOH), poly(methyl vinyl ether), polyethylenimine (PEI), polymethacrylate (PMA), poly methyl methacrylate (PMMA); vinyl chloride-acetate, poly(N-isopropylacrylamide) (PNIPAM), polyacrylamide (PAM), poly(2-oxazoline), poly(acrylic acid) (PAA), poly (tert-butyl acrylate), poly(sulfopropyl acrylate), poly(ethylene glycol), poly(ethylene oxide), poly(vinyl alcohol) (PVA), poly(vinylpyrrolidone) (PVP), polyelectrolytes, poly (styrenesulfonate) (PSS), polyacrylamide (PAM), poly (acrylic acid) (PAA), polyallylamine, cross-linked Polyethylene (PEX), or any combinations thereof. The separating wall may comprise of a distinct structure creating upstream and downstream chambers. In some embodiments, the separating wall may merely be the junction of the valve membrane to surrounding structure (e.g. if the entire circumference of a conduit defines the aperture). In some embodiments, the separating wall may be part of the structure of the conduit. For example, the valve is embedded into a conduit's wall where the aperture is defined by the hole through the wall.

In some embodiments, the valve membrane can comprise a graphene-based layer and a porous support, wherein the graphene-based layer deposited on the porous support. The graphene-based layer can be laminated on the porous substrate. The graphene-based layer can be deposited upon the porous support by blade coating, spray coating, dip coating, spin coating, tape casting, or film deposition (e.g. chemical vapor deposition). In some embodiments, the graphene-layer can be applied onto the porous substrate via filtration through the substrate, e.g. vacuum filtration. The valve oriented such that the graphene-based layer is positioned on the pressure side, or upstream, of the porous support. The valve membrane can provide repeatable passive regulation of the flow rate of the fluid that passes through the element as a function of upstream pressure.

In some embodiments, the graphene-based layer can comprise graphene, reduced graphene oxide, graphene oxide, or any combinations thereof. The graphene can be in the form of sheets, planes or flakes. In some embodiments, the graphene can have a surface area of between about 100-5000 m$^2$/gm, about 150-4000 m$^2$/gm, about 200-1000 m$^2$/gm, about 400-500 m$^2$/gm, or any surface area in a range bounded by any of these values.

In some embodiments, the graphene-based layer has a thickness of about 10-100 nm, about 10-50 nm, about 50-100 nm, about 20-50 nm, about 10-30 nm, about 10-15 nm, or about 15-20 nm.

In some embodiments, the graphene-based layer can further comprise a polymer material, where the graphene can be arranged in the polymer material in such a manner as to create an exfoliated nanocomposite, an intercalated nanocomposite, or a phase-separated microcomposite. A phase-separated microcomposite phase can be generated when, although mixed, the graphene exists as separate and distinct phases apart from the polymer. An intercalated nanocomposite can be generated when the polymer compounds begin to intermingle amongst or between the graphene platelets but the graphene is not distributed throughout the polymer. In an exfoliated nanocomposite phase the individual graphene platelets can be distributed within or throughout the polymer. An exfoliated nanocomposite phase can be achieved by chemically exfoliating the graphene by a modified Hummer's method, a process well known in the art. In some embodiments, the majority of the graphene can be staggered to create an exfoliated nanocomposite as a dominant material phase. The graphene material can be separated by about 10 nm, about 50 nm, about 100 nm, about 100-500 nm, about 100-200 nm, about 200-500 nm, about 1 micron, or any separation distance in a range bounded by any of these values.

In some embodiments, the polymer material in a graphene-based layer can comprise a hydrophilic polymer. For example, the hydrophilic polymer can comprise polyvinyl butyral (PVB), polyvinyl chloride (PVC), polyvinyl acetate (PVAc), polyacrylonitrile, ethylene vinyl alcohol (EVOH), poly(methyl vinyl ether), polyethylenimine (PEI), polymethacrylate (PMA), poly methyl methacrylate (PMMA); vinyl chloride-acetate, poly(N-isopropylacrylamide) (PNIPAM), polyacrylamide (PAM), poly(2-oxazoline), poly(acrylic acid) (PAA), poly(tert-butyl acrylate), poly(sulfopropyl acrylate), poly(ethylene glycol), poly(ethylene oxide), poly(vinyl alcohol) (PVA), poly(vinylpyrrolidone) (PVP), polyelectrolytes, poly(styrenesulfonate) (PSS), polyacrylamide (PAM), poly(acrylic acid) (PAA), polyallylamine, and any combinations thereof. In some embodiments, the polymer material is PVA.

In some embodiments, the polymer material comprises an aqueous solution of about 2-50 wt %, about 2.5-30 wt %, about 5-15 wt %, about 10-20 wt %, about 20-30 wt %, about 30-40 wt %, about 40-50 wt % polymer, or any wt % polymer in a range bounded by any of these values.

In some embodiments, the graphene-based layer can further comprise a crosslinker that creates covalent linkages between materials within the layer. The cross-linker can covalently bond adjacent graphene materials. The cross-linker can also create covalent bonds between a graphene material and a polymer. The crosslinker can simultaneously create bonds between adjacent graphene materials as well as between the graphene material and the polymer. It is believed that crosslinking the graphene material may enhance the resulting element's mechanical strength. In some embodiments, the graphene material may comprise crosslinked graphene material, wherein at least about 1%, about 5%, about 10%, about 20%, about 30%, about 40%, about 50%, about 60%, about 70%, about 80%, about 90%, about 95%, or all of the graphene material may be cross-linked. The amount of crosslinking may be estimated based on the wt % of the cross-linker as compared to the total amount of graphene material present.

In some embodiments, the crosslinker can comprise an optionally substituted alkyldiamine, an optionally substituted alkylenediamine, an optionally substituted arylenediamine, polyvinyl alcohol, or a combination thereof.

In some embodiments, the crosslinker can comprise an optionally substituted $C_{1-20}$ alkyldiamine, or an optionally substituted $C_{1-20}$ alkylenediamine. The resulting graphene material can be represented as:

wherein G represents a graphene material and Alk represents an optionally substituted alkylene group.

In some embodiments, the crosslinker can comprise an optionally substituted $C_{6-30}$ arylenediamine. The resulting graphene material can be represented as:

wherein G represents a graphene material and Ar is an optionally substituted arylene group. The optionally substituted arylene can be an optionally substituted phenyl group. In some embodiments, the arylenediamine cross-linker is meta-phenylenediamine.

In some embodiments, the porous support in a valve membrane can comprise a polymer. The polymer may be polyethylene, polypropylene, polysulfone (POLY), polyether sulfone (PES), polyvinylidene fluoride (PVDF), polyamide (Nylon), polyimide (PI), and/or any mixtures thereof. In some embodiments, the polymer may be Nylon. In some embodiments, the porous support may comprise a polysulfone based ultrafiltration membrane. In some embodiments, the porous support may comprise hollow fibers. The hollow fibers may be cast or extruded. The hollow fibers may be prepared as described in U.S. Pat. Nos. 4,900,626 and 6,805,730; and U.S. Patent Publication No. 2015/0165389, which are incorporated by reference in their methods of preparation. The porous support can be pretreated to aid in the adhesion of the graphene. The pretreatment can comprise polydopamine.

In some embodiments, the valve element can further comprise a dispersant. The dispersant can be ammonium salts, e.g., $NH_4Cl$; Flowlen; fish oil; long chain polymers; steric acid; oxidized Menhaden Fish Oil (MFO); dicarboxylic acids such as succinic acid, ethanedioic acid, propanedioic acid, pentanedioic acid, hexanedioic acid, heptanedioic acid, octanedioic acid, nonanedioic acid, decanedioic acid, o-phthalic acid, or p-phthalic acid; sorbitan monooleate; or any mixtures thereof. In some embodiments the dispersant is oxidized MFO.

In some embodiments, the valve element can further comprise at least an organic binder. The organic binders can be vinyl polymers. The vinyl polymers can be polyvinyl butyral (PVB), polyvinyl alcohol (PVA), polyvinyl chloride (PVC), polyvinyl acetate (PVAc), polyacrylonitrile, any mixtures thereof or any copolymers thereof; polyethyleneimine; poly methyl methacrylate (PMMA); vinyl chloride-acetate; and any mixtures thereof. In some embodiments, the organic binder is PVB.

In some embodiments, the valve element can further comprise plasticizers. The plasticizers can be Type 1 Plasticizers which can generally decrease the glass transition temperature ($T_g$), e.g. makes it more flexible, phthalates (n-butyl, dibutyl, dioctyl, butyl benzyl, esters, and dimethyl); and/or Type 2 Plasticizers, which can generate more flexible and more deformable layers, and may reduce the amount of voids resulting from lamination, e.g., glycols (polyethylene; polyalkylene; polypropylene; triethylene; dipropylglycol benzoate). Type 1 Plasticizers can include butyl benzyl phthalate, dicarboxylic/tricarboxylic ester-based plasticizers such as phthalate-based plasticizers such as bis(2-ethylhexyl) phthalate, diisononyl phthalate, bis(n-butyl)phthalate, butyl benzyl phthalate, diisodecyl phthalate, di-n-octyl phthalate, diisooctyl phthalate, diethyl phthalate, diisobutyl phthalate, di-n-hexyl phthalate and mixtures thereof; adipate-based plasticizers such as bis(2-ethylhexyl) adipate, dimethyl adipate, monomethyl adipate, dioctyl adipate, and mixtures thereof; sebacate-based plasticizers such as dibutyl sebacate, and maleate. Type 2 Plasticizers can include dibutyl maleate, diisobutyl maleate and mixtures thereof, polyalkylene glycols such as polyethylene glycol, polypropylene glycol and mixtures thereof. Other plasticizers which may be used include benzoates, epoxidized vegetable oils, sulfonamides such as N-ethyl toluene sulfonamide; N-(2-hydroxypropyl)benzene sulfonamide; N-(n-butyl)benzene sulfonamide, organophosphates such as tricresyl phosphate; tributyl phosphate, glycols/polyethers such as triethylene glycol dihexanoate; tetraethylene glycol diheptanoate and mixtures thereof, alkyl citrates such as triethyl citrate; acetyl triethyl citrate; tributyl citrate; acetyl tributyl citrate, trioctyl citrate; acetyl trioctyl citrate; trihexyl citrate; acetyl trihexyl citrate; butyryl trihexyl citrate; trimethyl citrate, alkyl sulphonic acid phenyl ester and mixtures thereof.

In some embodiments, solvents can also be present in the valve element. The functionalized graphene material can be dispersed, dissolved and/or mixed with a solvent. Some solvents can be used in the manufacture of material layers. The solvents include water; a lower alkanol such as ethanol, methanol, isopropyl alcohol; xylenes; cyclohexanone; acetone; toluene; methyl ethyl ketone; dimethylformamide; and/or mixtures thereof. Some embodiments can comprise xylene, ethanol and/or mixtures thereof. In some embodiments, the solvent is dimethylformamide (DMF).

In some embodiments, the valve membrane can further comprise a protective layer. The protective layer can be coated on the device. The protective layer can comprise a hydrophilic polymer such as the ones mentioned above, e.g. PVA.

III. Passive Flow Controller Device

In some embodiments, a passive flow controller device is described, wherein the device comprising the aforementioned valve element. The device can be used to regulate inlet pressure. In some embodiments, the device can regulate the inlet pressure between the opening threshold and the closing threshold. In some embodiments, the device can be used to regulate the flow or pressure of a dry gas. In some embodiments, the device can be used to regulate the flow or pressure of water vapor. In some embodiments, the device can be used to regulate the flow or pressure of a wet gas (gas with water vapor). In some embodiments, the device can be used to regulate the flow or pressure of liquids.

In some embodiments, as shown in FIGS. 1-6, the passive flow controller devices, 300, comprising at least a valve element, 200. In some embodiments, the passive flow controller device is located between a fluid at a higher pressure, 10, and a fluid at a lower pressure, 20, which creates a pressure differential across the valve when the gases are at different pressures. In some embodiments, the valve element can also contain a separating wall, 50, which precludes the fluid from the higher pressure freely traversing to the fluid in the lower pressure and vise versa, unless the fluid goes through the aperture, 60, which is occluded by the valve membrane, 100.

Figure 1:
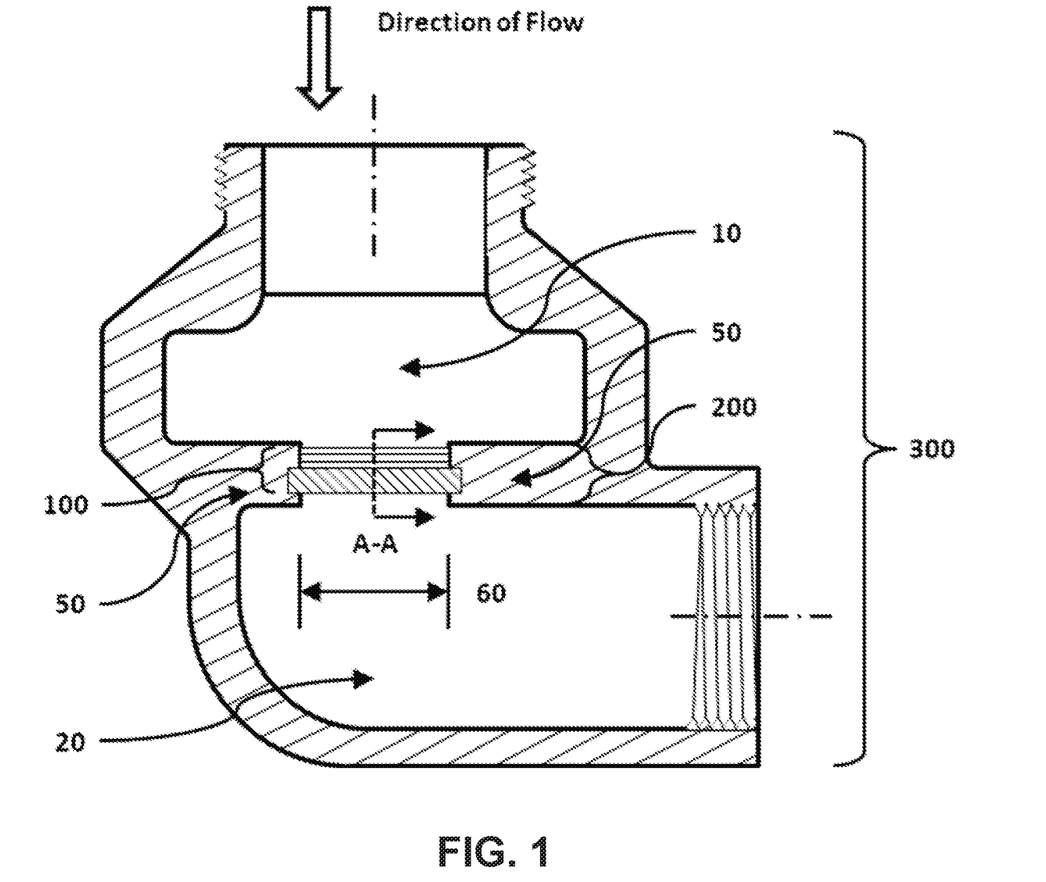
FIG. 1 is a schematic diagram of a possible embodiment of a passive flow controller device containing a valve element and a protective layer.
Figure 2:
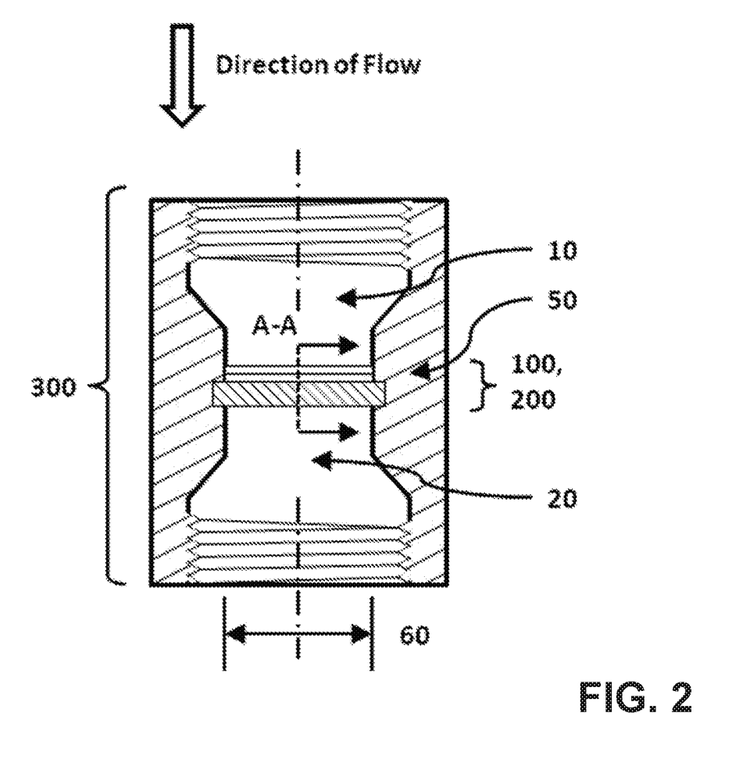
FIG. 2 is a schematic diagram of a possible embodiment of a passive flow controller device in an in-line configuration without a protective layer.
Figure 3:
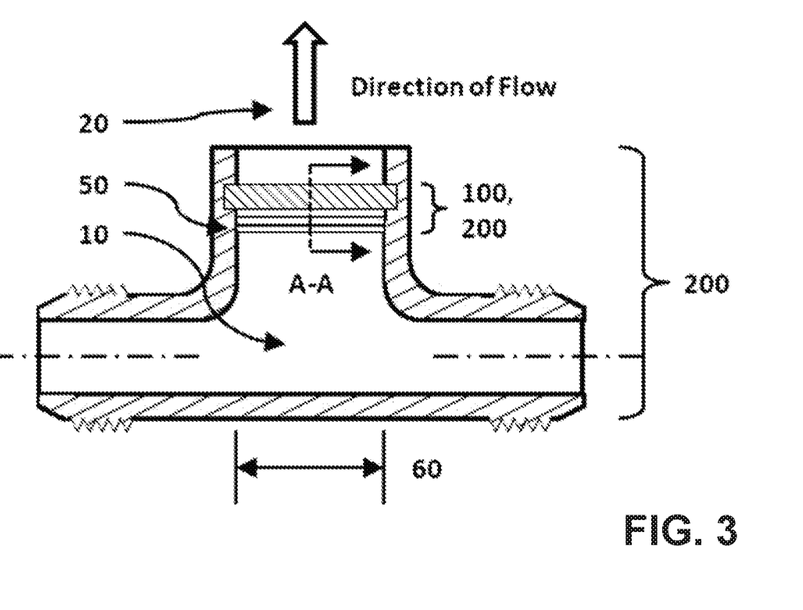
FIG. 3 is a schematic diagram of a possible embodiment of a passive flow controller device with a "T" shaped conduit configuration containing a protective layer.
Figure 4A:
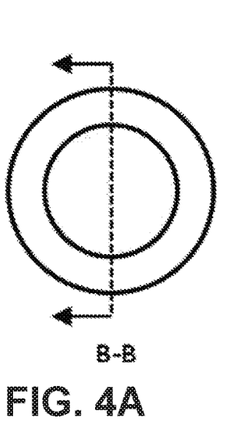
FIG. 4A is a schematic diagram of an end view of pipe of a possible embodiment of a passive flow controller device, which is integrated directly into a fluid conduit without protruding into the channel formed by the conduit, without a protective layer.
Figure 4B:
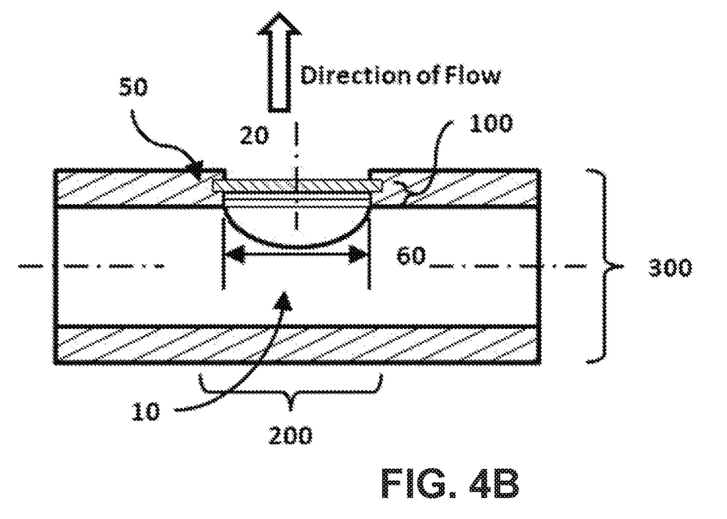
FIG. 4B is a schematic diagram of a cross section view taken along line B-B of FIG. 4A.
Figure 5:
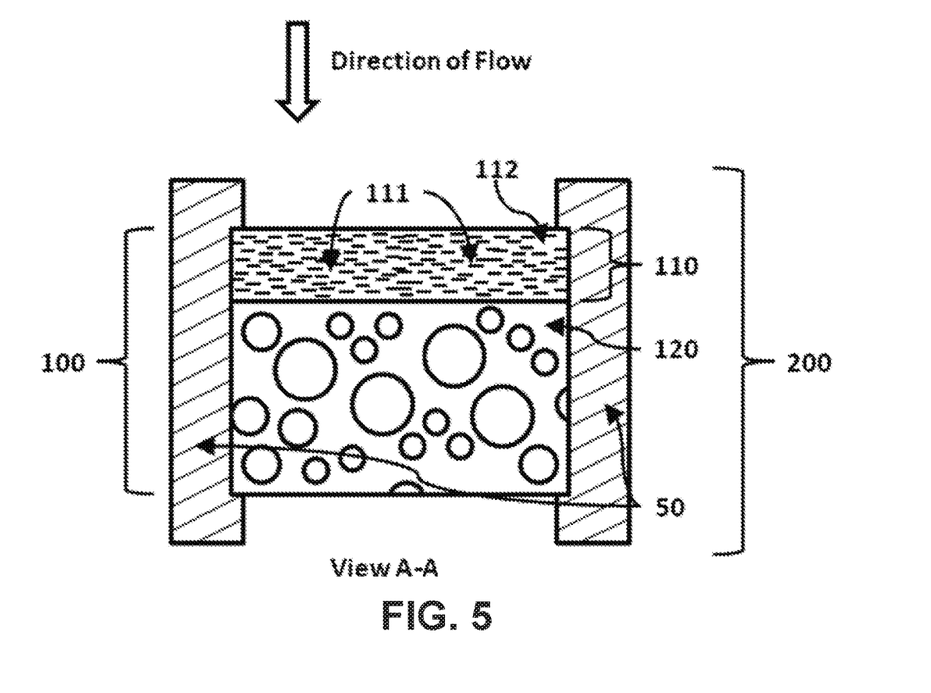
FIG. 5 is a schematic diagram (view A-A) of a possible embodiment of a passive flow controller device containing a valve element.
Figure 6:
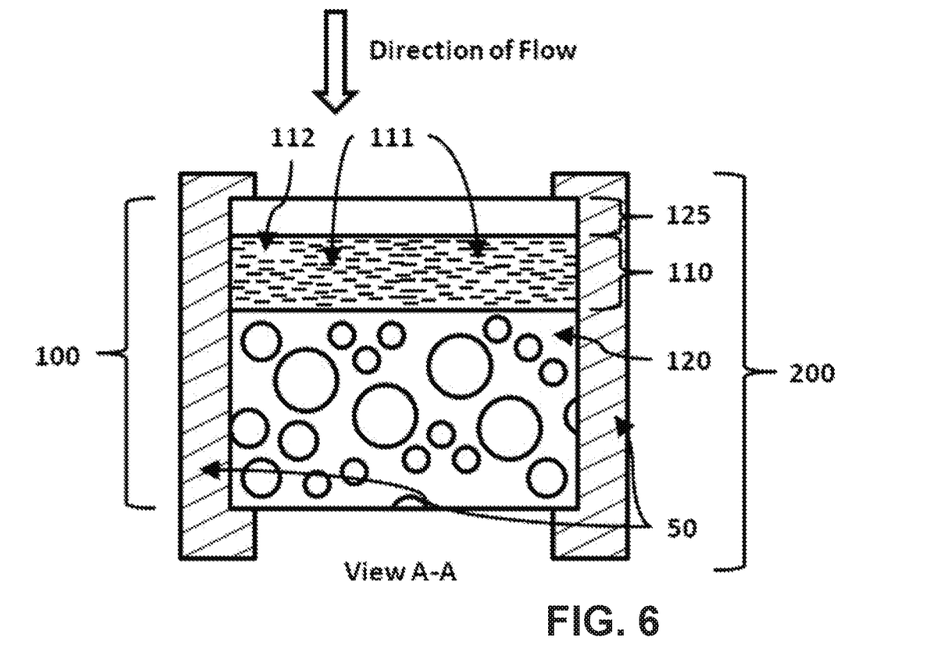
FIG. 6 is a schematic diagram of a possible embodiment of a passive flow controller device containing a valve element and a protective layer.

In some embodiments, as shown in FIGS. 5 and 6, the valve membrane comprises a graphene-based layer, 110, deposited on top of a porous support, 120, as characterized by pores. The graphene-based layer comprises graphene material, 111. In some embodiments, the graphene-based layer also comprises a polymer, 112, and the graphene is within a polymer matrix. In some embodiment, the valve membrane can also optionally comprise a protective coating/layer, 125 (FIG. 6).

IV. Coating Methods for Creating a Valve Element and Related Devices

Figure 7:
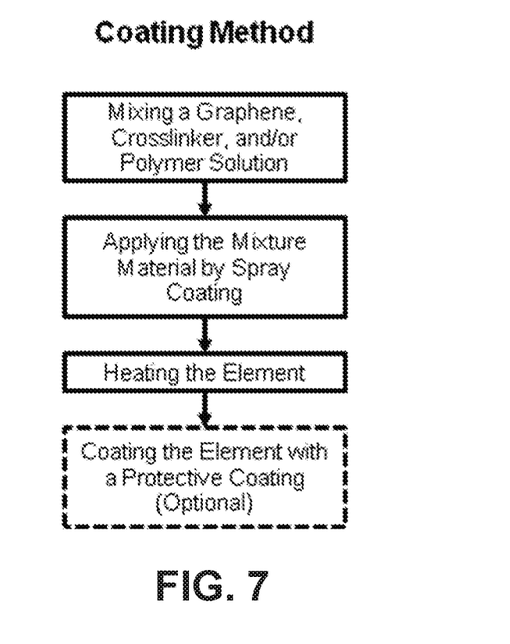
FIG. 7 is a schematic diagram of an embodiment of a method for creating a valve element and applying a graphene-based layer as a coating.

In some embodiments, a method for creating the aforementioned valve element is provided, as shown in FIG. 7, wherein the method involving coating the graphene-based layer onto a porous support. The coating method comprises: (a) dispersing a graphene and a polymer mixture in one or more solvents; (b) coating the dispersion on a substrate to create a thin film of about 10 nm to about 100 nm; and (c) heating the thin film coated substrate for about 15 minutes to 2 hours at a temperature ranging from 50° C. to about 120° C. In some embodiments, the method further comprises pretreating the porous support to increase the adhesion of the graphene material. In some embodiments, the method further comprises laminating the valve element with a protecting coating to yield a passive flow controller device.

In some embodiments, the graphene can be dispersed in water to create an aqueous mixture or a solution. The polymer can be in an aqueous solution. A graphene solution can also be mixed with a polymer solution to form an aqueous mixture. The mixing ratio of polymer solution to graphene solution by weight can be about 0.1-10, about 10, about 4, about 2, about 1, about 0.5, about 0.25, and about 0.1. In some embodiments, the mixing ratio by weight is about 1:1. In some embodiments, the graphene and polymer can be mixed such that the majority of the mixture comprises an exfoliated nanocomposite. In an exfoliated-nanocomposite phase, the graphene platelets are aligned such that permeability is reduced in the finished film by elongating the possible molecular pathways through the film. In some embodiments, the concentration of the graphene material in an aqueous solution is about 0.001-0.08 wt %, about 0.01-0.05 wt %, about 0.05-0.08 wt %, or about 0.04 wt %. In some embodiments the concentration of the polymer in an aqueous solution is about 5-15 wt %, about 5-10 wt %, about 10-15 wt %, or about 10 wt %.

In some embodiments, the coating method optionally comprises pretreating the porous support to increase adhesion of the graphene material to the support. For example, the porous support is pretreated with a dopamine solution. The dopamine solution is then polymerized to form a polydopamine on the support. The pretreated support is then dried at a temperature of about 40-90° C., about 40-50° C., about 50-60° C., about 60-70° C., about 70-90° C., or at about 65° C.

In some embodiments, the coating of the porous support (or substrate) with an aqueous mixture of the graphene material can be achieved by blade coating, spray coating, dip coating, spin coating, tape casting, film deposition, or other methods known in the art. In some embodiments, a thin film is spray coated such that the thickness is about 10-100 nm. The film can then be casted on the porous support to form a valve membrane, which results in a thin film coated support or substrate.

Then, the heating can be applied on the resulting thin film coated substrate to remove the underlying solvent from the graphene layer. In addition, heating the resulting coated substrate is also believed to facilitate crosslinking of the cross-linker and the graphene material. In some embodiments, the substrate is heated in an oven at a temperature of about 50-120° C., about 50-100° C., about 100-120° C., about 70-90° C., or about 80° C. In some embodiments, the membrane is heated for about 15 minutes to about 2 hours, about 30-60 minutes, about 1-2 hours, or about 30 minutes. The process results in a valve membrane.

After heating, the valve element can be then optionally laminated with a protective coating layer. The construction can be in such a way that the graphene layer is sandwiched between the substrate and the protective layer. The method for adding layers can be by co-extrusion, film deposition, blade coating or any other method known in the art. The additional layers may be added to enhance the properties of the valve element. In some embodiments, the protective layer is secured to the graphene-based layer with an adhesive layer to the valve element. In some embodiments, the valve element can yield a passive flow controller device.

V. Filter Methods for Creating a Valve Element and Related Devices

Figure 8:
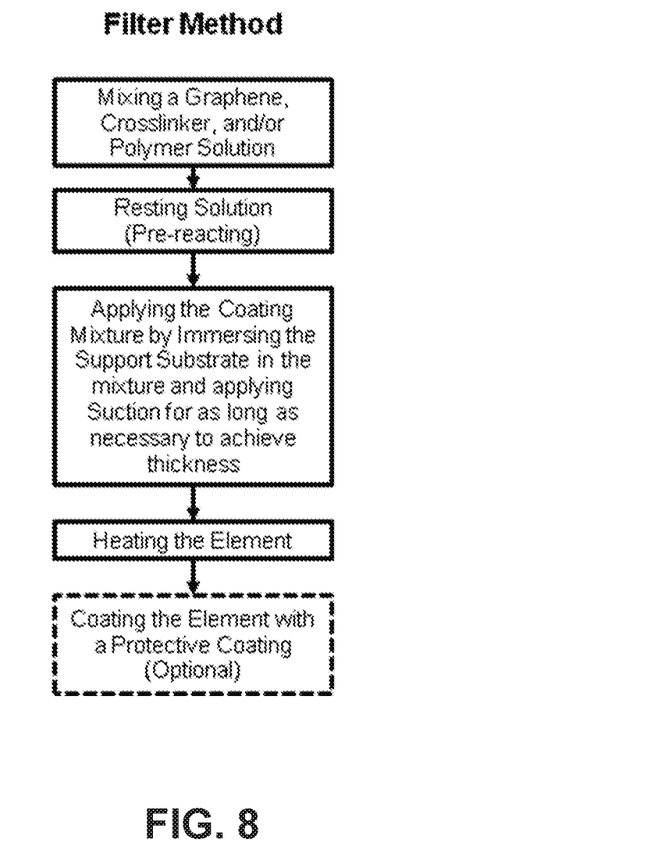
FIG. 8 is a schematic diagram of an embodiment of a method for creating a valve element and applying a graphene-based layer via a filter methodology.

In some embodiments, a filter method for creating a valve element is provided as shown in FIG. 8, wherein the method involving a filtration technique to apply the graphene-based layer onto the porous support. The filter method comprises: (a) dispersing the graphene and polymer mixture in one or more solvents; (b) immersing the porous substrate into the dispersion and then drawing the dispersion onto the substrate to create a thin film of about 10 nm to about 100 nm.

In some embodiments, the filter method first comprises mixing, graphene material, polymer, crosslinker, and DI water to create an aqueous solution. The solution is then rested for about 30 minutes to about 12 hours, about 1 hour to about 6 hours, or about 3 hours. It is believed that resting the solution allows the graphene material, crosslinker, and/or polymer to begin covalently bonding to facilitate a graphene-based layer, which results in a coating mixture.

The porous support is then immersed in the coating mixture. The coating mixture is then drawn into the support substrate to coat the surface by applying a negative pressure gradient across substrate causing the fluid of the coating mixture to move through the support substrate, depositing the mixed graphene material, polymer, and/or crosslinker on the surface of the porous support. The negative pressure gradient can be achieved through vacuum sucking. The duration of the drawing of the mixture is varied such that a thickness of about 10-100 nm of the coating layer is achieved. This process results in a coated substrate. The remaining steps of the filter method process are the same as that of the coating method.

The following embodiments are specifically contemplated:

Embodiment 1

A valve element disposed between a gas pressure differential, comprising:
(1) a separating wall placed between a gas at a higher pressure and a gas at a lower pressure, wherein the difference between the higher pressure and the lower pressure is a pressure differential, wherein the wall comprises an aperture allowing fluid communication between the gases;
(2) a valve membrane occluding the aperture, wherein the membrane comprises a graphene-based layer and a porous support, wherein the graphene based layer is deposited upon the porous support;

wherein the valve membrane allows the gas at the higher pressure to begin to pass through the aperture when the pressure differential reaches an opening threshold.

Embodiment 2

The valve element of embodiment 1, wherein the valve membrane precludes gas flow through the aperture when the pressure differential is at or below a closing threshold.

Embodiment 3

The valve element of embodiment 1 or 2, wherein the valve membrane allows gas flow through the aperture at a pressure differential at or above the opening threshold.

Embodiment 4

The valve element of embodiment 1, 2, or 3, wherein the valve membrane allows for repeated opening and closing of gas flow in response to changes in the pressure differential.

Embodiment 5

The valve element of embodiment 1, 2, 3, or 4, wherein the opening threshold increases with the increase in the thickness of the graphene-based layer.

Embodiment 6

The valve element of embodiment 2, 3, 4, or 5, wherein the closing threshold is at or below about 30 psi.

Embodiment 7

The valve element of embodiment 6, wherein the closing threshold is about 10 psi to about 15 psi.

Embodiment 8

The valve element of embodiment 3, wherein the opening threshold is about 10 psi to about 100 psi.

Embodiment 9

The valve element of embodiment 1, 2, 3, 4, 5, 6, 7, or 8, wherein the opening threshold is about 10 psi to about 20 psi.

Embodiment 10

The valve element of embodiment 9, wherein the opening threshold is about 20 psi to about 30 psi.

Embodiment 11

The valve element of embodiment 9, wherein the opening threshold is about 30 psi to about 40 psi.

Embodiment 12

The valve element of embodiment 9, wherein the opening threshold is more than 50 psi.

Embodiment 13

The valve element of embodiment 1, 2, 3, 4, 5, 6, 7, 8, 9, 19, 11, or 12, wherein the graphene-based layer comprises: graphene, reduced graphene oxide, or graphene oxide (GO).

Embodiment 14

The valve element of embodiment 1, 2, 3, 4, 5, 6, 7, 8, 9, 19, 11, 12, or 13, wherein the graphene-based layer has a thickness in a range of about 10 nm to about 100 nm.

Embodiment 15

The valve element of embodiment 1, 2, 3, 4, 5, 6, 7, 8, 9, 10, 11, 12, or 13, wherein the graphene-based layer has a thickness in a range of about 10 nm to about 15 nm.

Embodiment 16

The valve element of embodiment 1, 2, 3, 4, 5, 6, 7, 8, 9, 10, 11, 12, or 13, wherein the graphene-based layer has a thickness in a range of about 15 nm to about 20 nm.

Embodiment 17

The valve element of embodiment 1, 2, 3, 4, 5, 6, 7, 8, 9, 10, 11, 12, 13, 14, 15, or 16, wherein the graphene-based layer further comprises a crosslinker which creates covalent linkages between materials within the layer.

Embodiment 18

The valve element of embodiment 17, wherein the crosslinker comprises alkyldiamine, alkylenediamine, arylenediamine, polyvinyl alcohol, or a combination thereof.

Embodiment 19

The valve element of embodiment 18, wherein the arylenediamine comprises an optionally substituted meta-phenylenediamine.

Embodiment 20

The valve element of embodiment 18, wherein the arylenediamine is meta-phenylenediamine (MPD).

Embodiment 21

The valve element of embodiment 1, 2, 3, 4, 5, 6, 7, 8, 9, 10, 11, 12, 13, 14, 15, 16, 17, 18, 19, or 20, wherein the graphene-based layer comprises a GO-MPD membrane prepared from graphene oxide (GO) and meta-phenylenediamine (MPD).

Embodiment 22

The valve element of embodiment 1, 2, 3, 4, 5, 6, 7, 8, 9, 10, 11, 12, 13, 14, 15, 16, 17, 18, 19, 20, or 21, wherein the graphene-based layer further comprises a polymer material.

Embodiment 23

The valve element of embodiment 22, wherein the polymer material comprises a water soluble polymer.

Embodiment 24

The valve element of embodiment 23, wherein the water soluble polymer comprises polyvinyl alcohol.

Embodiment 25

The valve element of embodiment 1, 2, 3, 4, 5, 6, 7, 8, 9, 10, 11, 12, 13, 14, 15, 16, 17, 18, 19, 20, 21, 22, 23, or 24, wherein the porous support comprises a polymer or hollow fibers.

Embodiment 26

The valve element of embodiment 25, wherein the polymer is used as a base support which is further coated with polydopamine to form a polydopamine-coated support.

Embodiment 27

The valve element of embodiment 25, wherein the polymer is Nylon.

Embodiment 28

The valve element of embodiment 1, 2, 3, 4, 5, 6, 7, 8, 9, 10, 11, 12, 13, 14, 15, 16, 17, 18, 19, 20, 21, 22, 23, 24, 25, 26, or 27, wherein the porous support is coated with a graphene-based layer by filtration coating.

Embodiment 29

The valve element of embodiment 1, 2, 3, 4, 5, 6, 7, 8, 9, 10, 11, 12, 13, 14, 15, 16, 17, 18, 19, 20, 21, 22, 23, 24, 25, 26, or 27, wherein the porous support is coated with a graphene-based layer by spray coating.

Embodiment 30

The valve element of embodiment 1, 2, 3, 4, 5, 6, 7, 8, 9, 10, 11, 12, 13, 14, 15, 16, 17, 18, 19, 20, 21, 22, 23, 24, 25, 26, 27, 28, or 29, wherein the graphene-based layer is further optionally coated with a protecting layer.

Embodiment 31

A passive flow controller device, comprising the valve element of embodiment 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30, regulating upstream gas pressure or gas flow passively based on upstream pressure.

EXAMPLES

It has been discovered that embodiments of the valve elements described herein have passive flow restricting properties based on upstream pressure. As the restriction of passive flow can be reliably repeated, such elements are useful in flow control applications. Some of the benefits are shown in the following examples, which are intended to be illustrative of the embodiments of the disclosure, but are not intended to limit the scope or underlying principles in any way.

Example 1: Preparation of the Precursor Solutions

GO Preparation:

GO was prepared from graphite using the modified Hummers method. 2.0 g of Graphite flakes (100 mesh, Sigma Aldrich, St. Louis, Mo., USA) was oxidized in a mixture of 2.0 g of $NaNO_3$ (Aldrich), 10 g of $KMnO_4$ (Aldrich) and 96 mL of concentrated $H_2SO_4$ (Aldrich, 98%) at 50° C. for 15 hours. The resulting paste mixture was poured into 400 g of ice followed by adding 30 mL of hydrogen peroxide (30%, Sigma Aldrich, St. Louis, Mo., USA). The resulting solution was then stirred for 2 hours to reduce the manganese dioxide, filtered through filter paper and washed with DI water. The resulting solid collected was dispersed in DI water with stirring, centrifuged at 6300 rpm for 40 minutes, and the top aqueous layer was decanted. The remaining solid was then dispersed in DI water again and the above washing process was repeated 4 more times. The purified GO solid was then dispersed in DI water under sonication (with power of 20 W) for 2.5 hours to give the desired GO dispersion/solution (0.4 wt %) as IC-1.

GO-PVA Solution Preparation:

4 mg/mL of graphene oxide solution, IC-1, was diluted to 0.01% by de-ionized water. Then, 10.0 g of the resulting 0.01% graphene oxide aqueous dispersion was added to a mixture consisting of 10.0 g of 10% PVA aqueous solution (Sigma Aldrich, St. Louis, Mo., USA) and 0.1 mL of 1N HCl aqueous solution (Sigma Aldrich, St. Louis, Mo., USA). The resulting mixture was stirred at room temperature for 16 hours to yield a GO-PVA solution as IC-2.

GO-MPD Solution Preparation:

A solution was prepared similar to a method previously described in M. Hu and B. Mi, *Enabling Graphene Oxide Nanosheets as Water Separation Membranes*, 47 (8) Environ. Sci. Technol. 3715-3723 (2013), and its preparation is incorporated herein by reference. First, the GO dispersion, IC-1, was diluted with DI water to create a 0.1 wt % GO aqueous solution. Second, a 0.1 wt % meta-phenylenediamine (MPD) aqueous solution was prepared by dissolving appropriate amounts of meta-phenylenediamine (Aldrich) in DI water. Then, a coating mixture was created by mixing the aqueous solutions of 0.1 wt % GO and 0.1% MPD in DI water at a weight ratio of 1:1. The resulting mixture was then rested for about 3 hours, or until the GO and amine reacted to yield a GO-MPD solution, or IC-3.

Example 2: Preparation of a GO-MPD Valve Element Via Filtration Coating

Support Pretreatment:

The support pretreatment is done in a manner similar to a method previously described in Hu & Mi, supra. Its method of support pretreatment is incorporated herein by reference. A porous support, either polysulfone (POLY), polyether sulfone (PES), polyamide (Nylon), polyimide (PI), or polyvinylidene fluoride (PVDF), is used as a base support and is dip-coated in a dopamine solution (2 g/L dopamine (Aldrich) and 1.3 g/L Trizma base buffer (Aldrich)) at pH of 8.5. The dopamine is then polymerized to form polydopamine on the support. Then, the polydopamine-coated support is dried in oven at 65° C.

GO-MPD Application/Filtration Method:

The graphene-based layer was applied to the porous substrate in a manner similar to a method previously described, which is incorporated herein by reference (see Hu & Mi, supra). The porous support can be cleaned by rinsing with DI water thoroughly. Then, the coating solution, IC-3, is filtered through the pretreated support with vacuum sucking. After the solvent is filtered through the support, the resulting membrane deposited on its surface is then placed in oven at 80° C. for 30 minutes to facilitate further crosslinking. This process results in a valve element (VE-1).

Example 3: Preparation of a GO-MPD Valve Element Via Spray Coating

Support Pretreatment:

The support pretreatment was done in a manner similar to the method described in Example 2 above.

GO-MPD Application/Spray Coating Method:

First, the porous support was cleaned by rinsing with DI water thoroughly. Then, the porous support was then coated in the mixture coating solution of IC-3 by using a spray coating device. The resulting assembly was rinsed with DI water to remove any excess particles. The resulting membrane can be then placed in an oven at 80° C. for 30 minutes to facilitate further crosslinking. This process results in a valve element (VE-2).

Examples 4-8: Preparation of Various Valve Elements

Additional valve elements (VE-3 to VE-8) were built similar to VE-1 and VE-2 using the methods described in Examples 2 (filter coating) and 3 (spray coating), except the differences outlined in Table 1.

TABLE 1

Configuration for Various Valve Embodiments.

| ID# | Example | Method | Base | Film | Film Thickness [nm] |
|---|---|---|---|---|---|
| VE-1 | Example 2 | Filter Coating | Nylon | GO; MPD | 13 |
| VE-2 | Example 3 | Spray Coating | Nylon | GO; MPD | 13 |
| VE-3 | Example 4 | Filter Coating | Nylon | GO; PVA | ~ |
| VE-4 | Example 4 | Spray Coating | Nylon | GO; PVA | ~ |
| VE-5 | Example 5 | Filter Coating | Nylon | GO | ~ |
| VE-6 | Example 6 | Spray Coating | Nylon | GO | ~ |
| VE-7 | Example 7 | Spray Coating | Nylon | GO; MPD | 16 |
| VE-8 | Example 8 | Spray Coating | Nylon | GO; MPD | 20 |

Example 9: Measurement of Valve Elements

Valve elements VE-2, VE-7 and VE-8 were examined to determine their flow characteristics. The flow characteristics were measured by placing the valve element in a holder that had one input and two output channels (A and B), wherein the output channel A was directly downstream of the valve element and the second channel B was the output of gas which did not pass through the membrane. The flow rate of each output channel was measured by having the gas traverse a flow meter before emptying into a test tube. On the higher pressure side was a supply gas of Nitrogen (Airgas, San Marcos, Calif., USA) at an adjustable pressure from 0 psig (or valve closed) to 30 psig that was either directly fed into the system or bubbled through DI water first to create wet Nitrogen. The flow rates at various input pressures were measured and the input pressure was dynamically varied to determine the passive response of the valve elements.

Figure 9A:
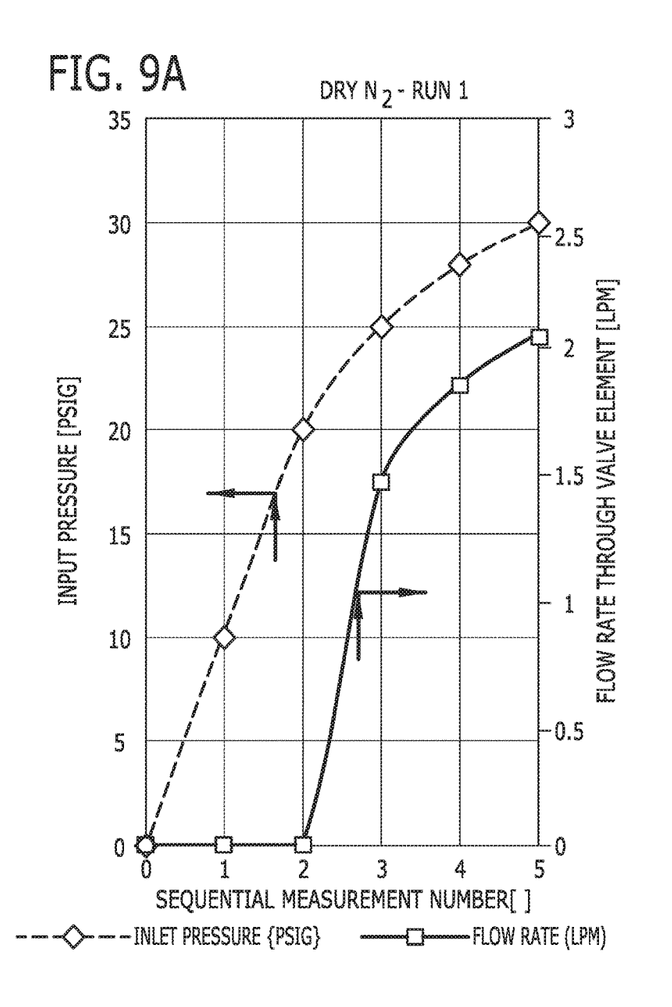
FIGS. 9A and 9B shows two plots of flow rate as a function inlet pressure for the same embodiment to show repeatability and the ability of the element to reseal.
Figure 9B:
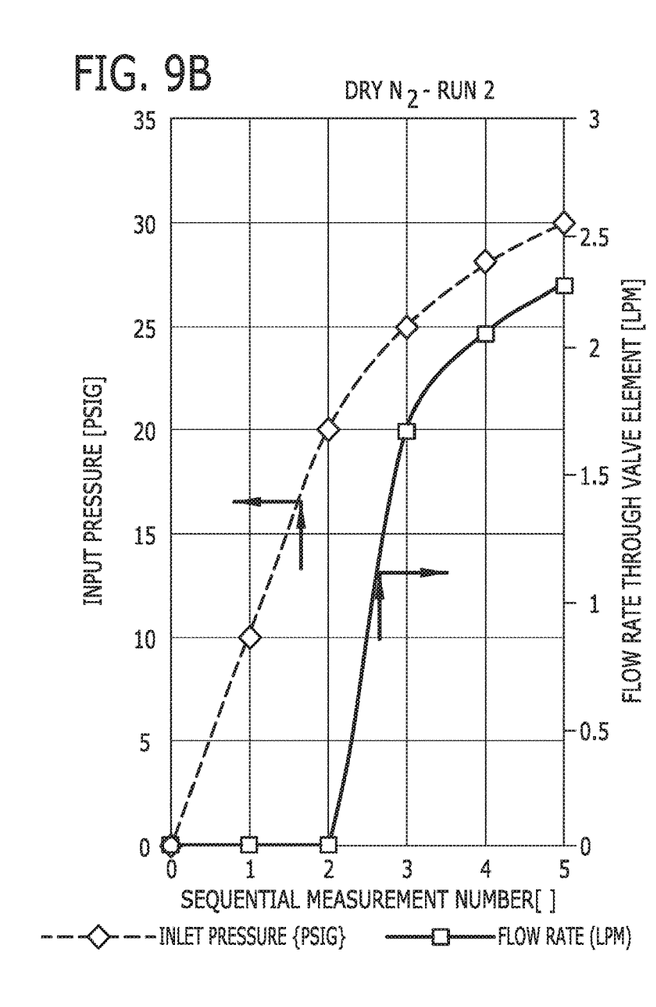

For VE-2, the element was placed into the set-up for dry nitrogen and the valve was tested to measure the opening threshold (Run 1), the experiment was then duplicated again (Run 2) to determine the repeatability. The results are shown in FIGS. 9A and 9B which shows the flow rate as a function of pressure, for two subsequent runs, Run 1 and Run 2. In between the runs, the nitrogen supply was closed and the set-up was allowed to vent to atmosphere. The results show that after the valve closes, it maintains a barrier until a predictable opening threshold (from Run 1) is again attained, and the result of Run 1 is repeatable in Run 2.

Figure 10:
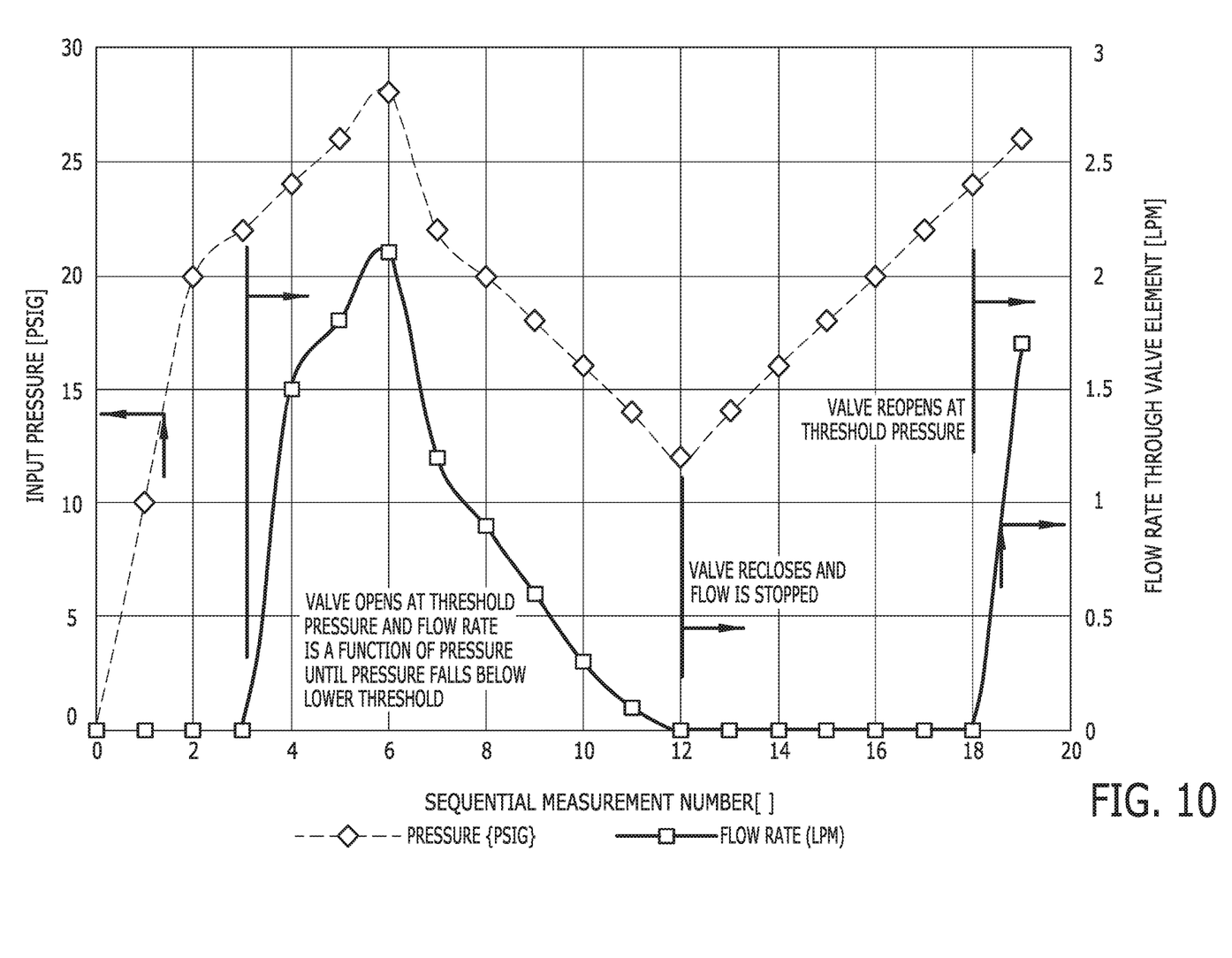
FIG. 10 shows a plot of flow rate as a function of inlet pressure for an embodiment with more measurement numbers to show the ability of the valve element to finely control flow rate after reaching the opening threshold and to reseal once the closing threshold was reached.
Figure 11:
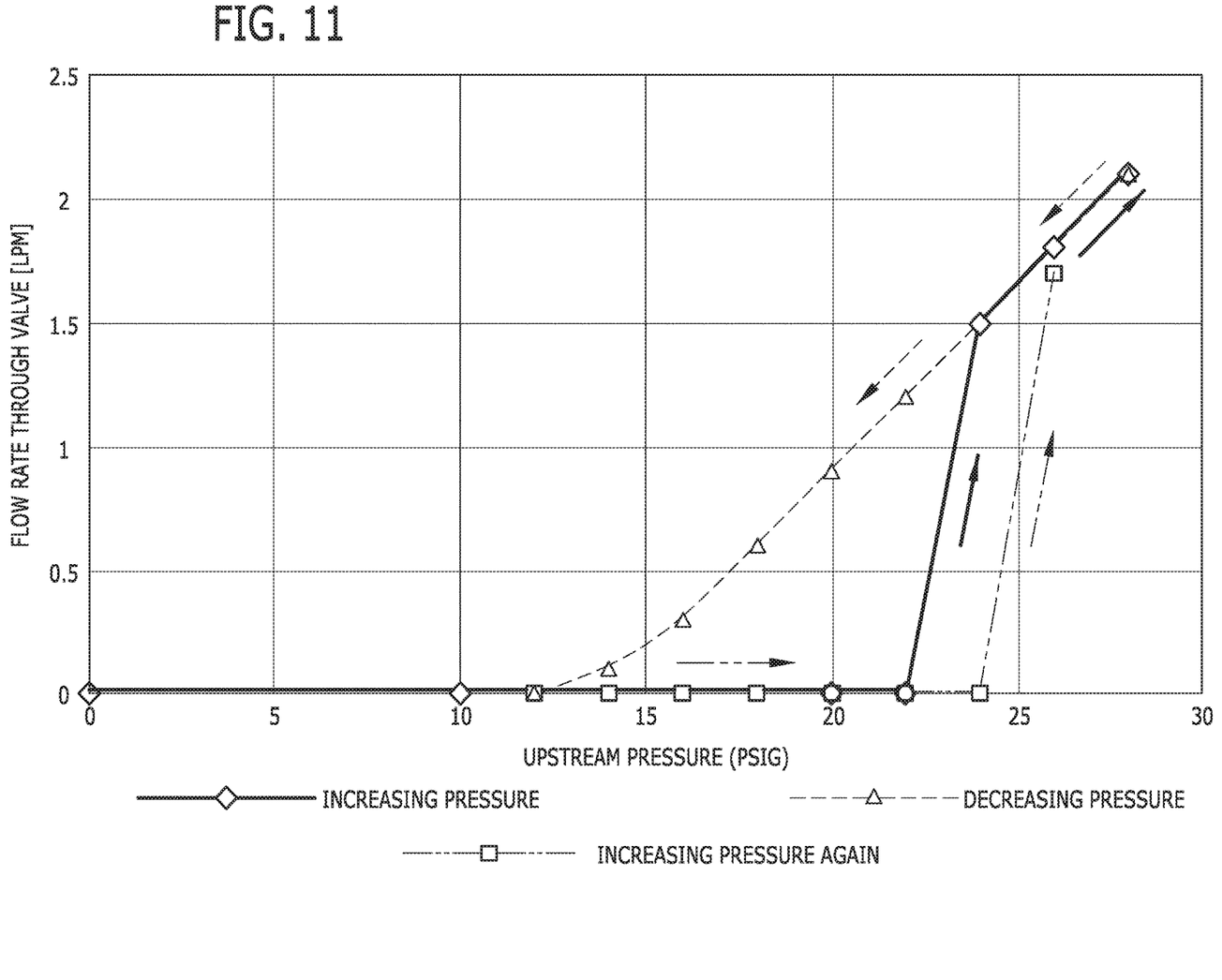
FIG. 11 is another depiction of the same experimental data in FIG. 10 showing the similarity of the valve's response once the valve was reclosed.

After the repeatability was demonstrated in the above experiments, the effect of the behavior of the valve was then examined by exposing the valve to the opening threshold and then varying the pressure. The results are shown for dry nitrogen in FIG. 10 and FIG. 11. It was observed that the once the opening threshold was reached, additional pressure would increase the flow rate (see flow rates for measurement No. from 4 to 6). However, once the valve is opened, the valve would limit but not preclude the flow when the upstream pressure was below the opening threshold but above the closing threshold (see flow rates for measurement No. from 6 to 11). The closing threshold was observed to be at 12 psig, where the valve reclosed. The valve reopened once a threshold of about 26 psi was attained, demonstrating its ability to let the valve remain shut after it closes until reaching the opening threshold again.

In addition, VE-2 was then exposed to wet nitrogen gas (nitrogen gas plus water vapor) to determine if there was any effect of water vapor on the graphene film. The results are shown in Table 2, which shows that the valve element behaves the same way when exposed to a gas containing water vapor versus a dry gas. In addition, the valve element continued to operate predictably over several test runs with the ability of reclosing and regaining its blocking properties of gas flow.

TABLE 2

Measurement of GO-MPD Valve Element Sensitivity to Wet - $N_2$ Gas.

| ID # | Run #1 | #2 | #3 | #4 | #5 | #6 | #7 | #8 | #9 | #10 | #11 |
|---|---|---|---|---|---|---|---|---|---|---|---|
| Opening Threshold [psig] | 30 | 31 | 30 | 31 | 30 | 30 | 30 | 31 | 31 | 25 | 31 |
| Flow Rate [LPM] | 1.5 | 1.6 | 1.5 | 1.6 | 1.5 | 1.5 | 1.5 | 1.6 | 1.6 | 0.9 | 1.6 |

Note:
Between runs, the experiment was reset by closing supply and any pressure in the system was blown off.

In addition, the effect of thickness of GO membranes on opening threshold was also examined by using VE-2, VE-7, and VE-8 with graphene membrane thickness of 13 nm, 16 nm, and 20 nm respectively. To minimize the variation of specific element characteristics, several samples of the same valve element were used to conduct the experiments and an average opening threshold for each valve was calculated based on a series of experiments. The results are presented in Table 3. Although the opening threshold varies for each sample, but overall on average, there was a general trend that the opening threshold increases with the increase in the thickness of the graphene membrane.

TABLE 3

Opening Threshold for Various Thickness Valve Elements.

| Embodiment | Sample | #1 | #2 | #3 | #4 | #5 | Average |
|---|---|---|---|---|---|---|---|
| VE-2 (13 nm) | VE-2-1 | 25 | 25 | 24 | 26 | — | 25 |
| | VE-2-2 | 15 | 16 | 22 | 22 | 16 | 18.2 |
| | VE-2-3 | 22 | 20 | 18 | 20 | — | 20 |
| | VE-2-4 | 10 | 10 | — | — | — | 10 |

TABLE 3-continued

Opening Threshold for Various Thickness Valve Elements.

| Embodiment | Sample | #1 | #2 | #3 | #4 | #5 | Average |
|---|---|---|---|---|---|---|---|
| VE-7 (16 nm) | VE-7-1 | 32 | — | — | — | — | 32 |
| | VE-7-2 | >50 | >50 | — | — | — | >50 |
| | VE-7-3 | 37 | 38 | — | — | — | 37.5 |
| | VE-7-4 | 40 | 40 | — | — | — | 40 |
| VE-8 (20 nm) | VE-8-1 | 37 | 35 | 36 | — | — | 36 |
| | VE-8-2 | 29 | 29 | — | — | — | 29 |
| | VE-8-3 | >55 | >55 | >55 | — | — | >55 |

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability.

Certain embodiments are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed is:

1. A valve element disposed between a gas pressure differential, comprising:
    (1) a separating wall placed between a gas at a higher pressure and a gas at a lower pressure, wherein the difference between the higher pressure and the lower pressure is a pressure differential, wherein the wall comprises an aperture allowing fluid communication between the gases;
    (2) a valve membrane occluding the aperture, wherein the membrane comprises a graphene-based layer and a porous support, wherein the graphene-based layer is deposited upon the porous support;
        wherein the graphene-based layer comprises graphene oxide and a crosslinker which creates covalent linkages between materials within the graphene-based layer, wherein the crosslinker comprises an alkyldiamine, an arylenediamine, polyvinyl alcohol, or a combination thereof;
        wherein the valve membrane allows the gas at the higher pressure to begin to pass through the aperture when the pressure differential reaches an opening threshold.

2. The valve element of claim 1, wherein the valve membrane precludes gas flow through the aperture when the pressure differential is at or below a closing threshold.

3. The valve element of claim 2, wherein the closing threshold is at or below about 30 psi.

4. The valve element of claim 3, wherein the closing threshold is about 10 psi to about 15 psi.

5. The valve element of claim 1, wherein the valve membrane allows for repeated opening and closing of gas flow in response to changes in the pressure differential.

6. The valve element of claim 1, wherein the opening threshold increases with the increase in the thickness of the graphene-based layer.

7. The valve element of claim 1, wherein the opening threshold is about 10 psi to about 100 psi.

8. The valve element of claim 7, wherein the opening threshold is about 20 psi to about 30 psi.

9. The valve element of claim 1, wherein the graphene-based layer comprises graphene oxide (GO).

10. The valve element of claim 1, wherein the graphene-based layer has a thickness of about 10 nm to about 100 nm.

11. The valve element of claim 10, wherein the graphene-based layer has a thickness of about 10 nm to about 15 nm, or about 15 nm to about 20 nm.

12. The valve element of claim 1, wherein the graphene-based layer further comprises a crosslinker which creates covalent linkages between materials within the layer.

13. The valve element of claim 1, wherein the arylenediamine is meta-phenylenediamine (MPD).

14. The valve element of claim 1, wherein the graphene-based layer comprises a GO-MPD membrane prepared from graphene oxide (GO) and meta-phenylenediamine (MPD).

15. The valve element of claim 1, wherein the graphene-based layer further comprises a polymer material.

16. The valve element of claim 15, wherein the polymer material comprises a water soluble polymer comprising polyvinyl alcohol.

17. The valve element of claim 1 wherein the porous support comprises a polymer or hollow fibers.

18. The valve element of claim 1, wherein the graphene-based layer is further coated with a protecting layer.

19. A passive flow controller device, comprising the valve element of claim 1, regulating upstream gas pressure or gas flow passively based on upstream pressure.

* * * * *

UNITED STATES PATENT AND TRADEMARK OFFICE
CERTIFICATE OF CORRECTION

PATENT NO. : 10,722,849 B2
APPLICATION NO. : 16/076814
DATED : July 28, 2020
INVENTOR(S) : Weiping Lin et al.

It is certified that error appears in the above-identified patent and that said Letters Patent is hereby corrected as shown below:

On the Title Page

Applicants item (71) - Remove "Weiping Lin"

Signed and Sealed this
Sixth Day of October, 2020

Andrei Iancu
*Director of the United States Patent and Trademark Office*